(12) United States Patent
Niu et al.

(10) Patent No.: US 11,216,504 B2
(45) Date of Patent: Jan. 4, 2022

(54) DOCUMENT RECOMMENDATION METHOD AND DEVICE BASED ON SEMANTIC TAG

(71) Applicant: BEIJING BAIDU NETCOM SCIENCE AND TECHNOLOGY CO., LTD., Beijing (CN)

(72) Inventors: Guocheng Niu, Beijing (CN); Bolei He, Beijing (CN); Chengxiang Liu, Beijing (CN); Xinyan Xiao, Beijing (CN); Yajuan Lyu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 212 days.

(21) Appl. No.: 16/705,749

(22) Filed: Dec. 6, 2019

(65) Prior Publication Data
US 2020/0210468 A1    Jul. 2, 2020

(30) Foreign Application Priority Data
Dec. 28, 2018   (CN) .......................... 201811621674.8

(51) Int. Cl.
*G06F 16/36* (2019.01)
*G06F 40/30* (2020.01)
(Continued)

(52) U.S. Cl.
CPC ............ *G06F 16/36* (2019.01); *G06F 40/295* (2020.01); *G06F 40/30* (2020.01); *G06N 3/08* (2013.01)

(58) Field of Classification Search
None
See application file for complete search history.

(56) References Cited

U.S. PATENT DOCUMENTS

2009/0210408 A1* 8/2009 Boyer ................... G06F 16/907
2009/0254540 A1* 10/2009 Musgrove ............... G06F 16/31
(Continued)

FOREIGN PATENT DOCUMENTS

CN    104199838 A    12/2014
CN    104615783 A    5/2015
(Continued)

OTHER PUBLICATIONS

Chinese Patent Application No. 201811621674.8 Office Action dated Aug. 3, 2021, 10 pages.
(Continued)

*Primary Examiner* — Robert W Beausoliel, Jr.
*Assistant Examiner* — Cheryl M Shechtman
(74) *Attorney, Agent, or Firm* — Lathrop GPM LLP

(57) ABSTRACT

A document recommendation method based on a semantic tag and a document recommendation device. The method includes: for each document, acquiring a first candidate tag set corresponding to the document, and processing each first candidate tag in the first candidate tag set corresponding to the document to obtain a second candidate tag set corresponding to the document; performing normalization processing on each second candidate tag in the second candidate tag set corresponding to the document to obtain a third candidate tag set corresponding to the document; performing expanding process on each third candidate tag in the third candidate tag set corresponding to the document, and acquiring a fourth candidate tag set corresponding to the document, to form a document library having semantic tags; and recommending a target document obtained from the document library having semantic tags to the user, according to historical semantic tag.

15 Claims, 6 Drawing Sheets

(51) Int. Cl.
*G06F 40/295* (2020.01)
*G06N 3/08* (2006.01)

(56) References Cited

U.S. PATENT DOCUMENTS

| | | | | |
|---|---|---|---|---|
| 2016/0012019 A1* | 1/2016 | Bagwell | ............... | G06F 16/35 |
| | | | | 707/738 |
| 2016/0034512 A1* | 2/2016 | Singhal | ............... | G06F 16/35 |
| | | | | 707/737 |
| 2017/0235820 A1* | 8/2017 | Conrad | ............... | G06F 16/358 |
| | | | | 707/728 |
| 2018/0300315 A1* | 10/2018 | Leal | ............... | G06F 40/268 |

FOREIGN PATENT DOCUMENTS

| | | | |
|---|---|---|---|
| CN | 105653706 | A | 6/2016 |
| CN | 106354860 | A | 1/2017 |
| CN | 106776881 | A | 5/2017 |
| CN | 107122399 | A | 9/2017 |
| CN | 107330023 | A | 11/2017 |
| CN | 108829819 | A | 11/2018 |
| CN | 108875059 | A | 11/2018 |
| CN | 108897871 | A | 11/2018 |

OTHER PUBLICATIONS

Chinese Patent Application No. 201811621674.8 English translation of Office Action dated Aug. 3, 2021, 14 pages.

Chen, J. "The Research of Several Key Technologies of Word Sense Disambiguation", Dissertation Submitted to Wuhan University, Oct. 2012, 134 pages.

* cited by examiner

DOCUMENT RECOMMENDATION METHOD AND DEVICE BASED ON SEMANTIC TAG

This application is based on and claims priority of Chinese Patent Application 201811621674.8 filed on Dec. 28, 2018, the entire contents of which are incorporated herein by reference.

TECHNICAL FIELD

The present disclosure relates to a recommendation technology field, and more particularly, to a document recommendation method based on a semantic tag and a document recommendation method based on a semantic tag.

BACKGROUND

With continued development of interne technologies, information flow services have gradually replaced traditional media as an important means for users to obtain information. However, information flow carries too much information, which is likely to cause overload information for user and prevent timely acquisition of information which the user is interested in.

In the related art, a personalized recommendation technology based on a content focus can achieve accurate information push. However, the tags in the above method are not at the semantic level, which leads to serious ambiguity problems and causes low recommendation accuracy.

SUMMARY

The present disclosure aims to solve at least one of the above problems to at least some extent.

Accordingly, embodiments of the present disclosure provide a document recommendation method based on a semantic tag, configured to solve a problem in the related art that the tags are not at a semantic level, which leads to serious ambiguity problems and causes low recommendation accuracy.

In order to achieve the above objective, embodiments of a first aspect of the present disclosure provide a document recommendation method based on a semantic tag, including: matching a plurality of documents by using a preset set of focus points so as to, for each document, obtain a first candidate tag set corresponding to the document; performing an expanding processing on each first candidate tag in the first candidate tag set corresponding to the document, to obtain a second candidate tag set corresponding to the document; performing a normalization processing on each second candidate tag in the second candidate tag set corresponding to the document by using a preset normalization dictionary to obtain a third candidate tag set corresponding to the document; performing an expanding processing on each third candidate tag in the third candidate tag set corresponding to the document by using a preset disambiguation dictionary to obtain a fourth candidate tag set corresponding to the document; acquiring a semantic matching degree between each fourth candidate tag in the fourth candidate tag set corresponding to the document and the document by using a semantic matching model, and taking the fourth candidate tag with the semantic matching degree greater than a preset matching threshold as the semantic tag of the document, to form a document library having semantic tags; and acquiring historical behavior information of a user, and acquiring a historical semantic tag based on the historical behavior information, and recommending a target document obtained from the document library having semantic tags based on the historical semantic tag to the user.

With the document recommendation method based on a semantic tag according to embodiments of the present disclosure, a plurality of documents are matched by using a preset set of focus points so as to, for each document, obtain a first candidate tag set corresponding to the document, an expanding processing is performed on each first candidate tag in the first candidate tag set corresponding to the document to obtain a second candidate tag set corresponding to the document, a normalization processing is performed on each second candidate tag in the second candidate tag set corresponding to the document by using a preset normalization dictionary to obtain a third candidate tag set corresponding to the document, an expanding processing is performed on each third candidate tag in the third candidate tag set corresponding to the document by using a preset disambiguation dictionary to obtain a fourth candidate tag set corresponding to the document, a semantic matching degree between each fourth candidate tag in the fourth candidate tag set corresponding to the document and the document is acquired by using a semantic matching model, and the fourth candidate tag with the semantic matching degree greater than a preset matching threshold is taken as the semantic tag of the document, to form a document library having semantic tags, historical behavior information of a user is acquired, and a historical semantic tag is acquired based on the historical behavior information, and a target document obtained from the document library having semantic tags based on the historical semantic tag is recommended to the user. Therefore, the semantic tags in the embodiments are non-repetitive and unambiguous, such that the document recommendation is more accurate and the user experience is improved.

In order to achieve the above objectives, embodiments of a second aspect of the present disclosure provide a document recommendation device based on a semantic tag, including: a matching module, configured to match a plurality of documents by using a preset set of focus points so as to, for each document, obtain a first candidate tag set corresponding to the document; a first expanding module, configured to perform an expanding processing on each first candidate tag in the first candidate tag set corresponding to the document, to obtain a second candidate tag set corresponding to the document; a normalization processing module, configured to perform a normalization processing on each second candidate tag in the second candidate tag set corresponding to the document by using a preset normalization dictionary to obtain a third candidate tag set corresponding to the document; a second expanding module, configured to perform an expanding processing on each third candidate tag in the third candidate tag set corresponding to the document by using a preset disambiguation dictionary to obtain a fourth candidate tag set corresponding to the document; a first processing module, configured to acquire a semantic matching degree between each fourth candidate tag in the fourth candidate tag set corresponding to the document and the document by using a semantic matching model, and take the fourth candidate tag with the semantic matching degree greater than a preset matching threshold as the semantic tag of the document, to form a document library having semantic tags; and a recommending module, configured to acquire historical behavior information of a user, and acquire a historical semantic tag based on the historical behavior information of the user, and recommend a target document obtained from the document library having semantic tags based on the historical semantic tag to the user.

With the document recommendation device based on a semantic tag according to the embodiments of the present disclosure, a plurality of documents are matched by using a preset set of focus points so as to, for each document, obtain a first candidate tag set corresponding to the document, an expanding processing is performed on each first candidate tag in the first candidate tag set corresponding to the document to obtain a second candidate tag set corresponding to the document, a normalization processing is performed on each second candidate tag in the second candidate tag set corresponding to the document by using a preset normalization dictionary to obtain a third candidate tag set corresponding to the document, an expanding processing is performed on each third candidate tag in the third candidate tag set corresponding to the document by using a preset disambiguation dictionary to obtain a fourth candidate tag set corresponding to the document, a semantic matching degree between each fourth candidate tag in the fourth candidate tag set corresponding to the document and the document is acquired by using a semantic matching model, and the fourth candidate tag with the semantic matching degree greater than a preset matching threshold is taken as the semantic tag of the document, to form a document library having semantic tags, historical behavior information of a user is acquired, and a historical semantic tag is acquired based on the historical behavior information, and a target document obtained from the document library having semantic tags based on the historical semantic tag is recommended to the user. Therefore, the semantic tags in the embodiments are non-repetitive and unambiguous, such that the document recommendation is more accurate and the user experience is improved.

In order to achieve the above objective, embodiments of a third aspect of the present disclosure provide a computer device including a processor and a memory. The processor runs a program corresponding to an executable program code by reading the executable program code stored in the memory for implementing the document recommendation method based on a semantic tag as described in the embodiments of the first aspect.

In order to achieve the above objective, embodiments of a fourth aspect of the present disclosure provide a non-transitory computer readable storage medium having a computer program stored thereon. When the program is executed by a processor, the document recommendation method based on a semantic tag as described in the embodiments of the first aspect is implemented.

In order to achieve the above objective, embodiments of a fifth aspect of the present disclosure provide a computer program product. When instructions in the computer program product are executed by a processor, the document recommendation method based on a semantic tag as described in the embodiments of the first aspect is implemented.

Additional aspects and advantages of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
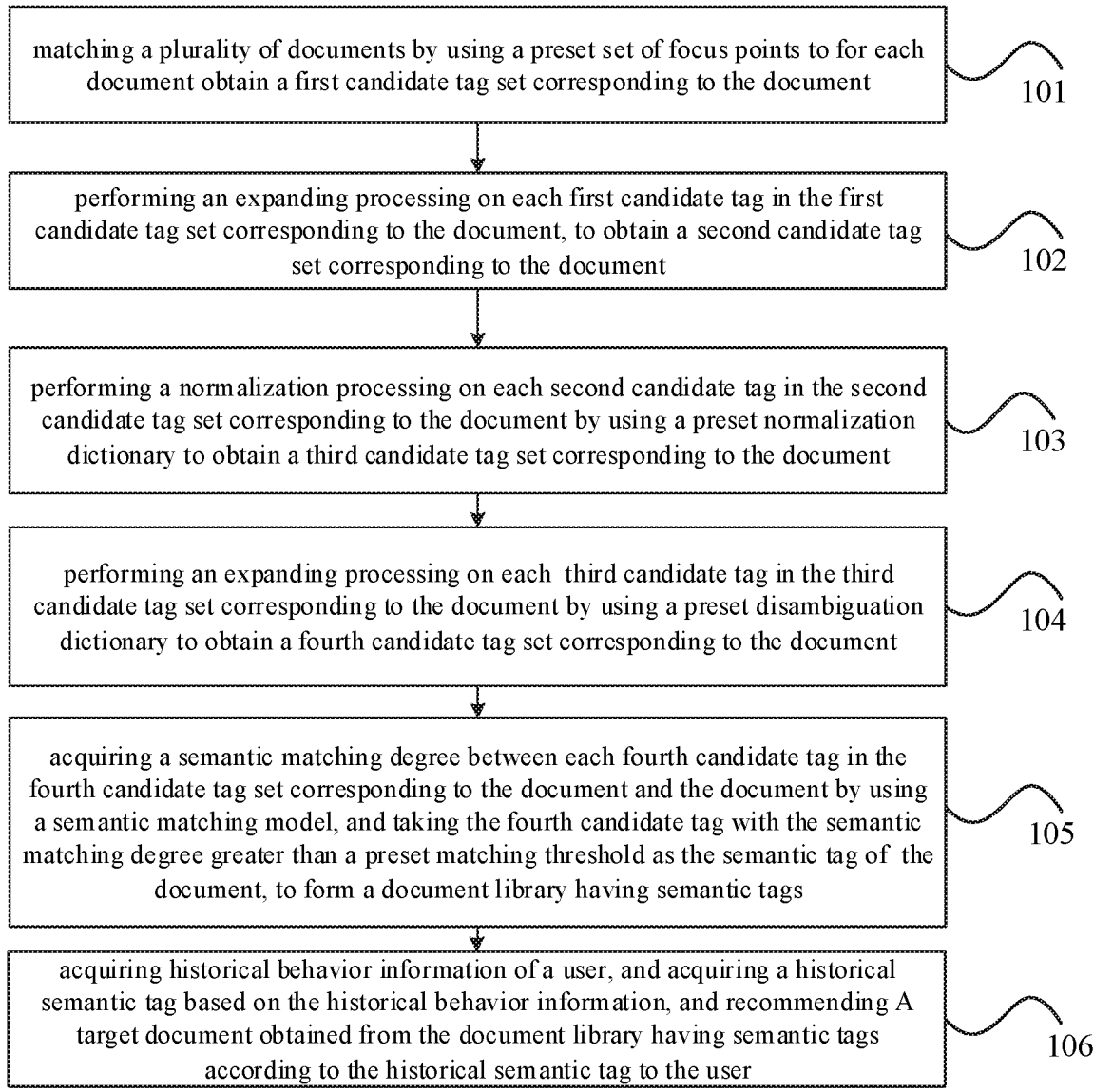
FIG. 1 is a flow chart of a document recommendation method based on a semantic tag according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

The document recommendation method based on a semantic tag and the document recommendation device based on a semantic tag according to the embodiments of the present disclosure are described below with reference to the accompanying drawings.

Based on description in the background, it can be understood that the tags in a document recommendation method based on a focus point are not at a semantic level, and there are serious ambiguity problems, resulting in low recommendation accuracy. For example, an article about "Xiaomi phone" is tagged with "Xiaomi", and an article about millet may also be tagged with "Xiaomi". The tag "Xiaomi" itself is not a semantic tag, if the article about millet is recommended to people who have seen the Xiaomi phone relying on this tag, a problem of poor user experience may be caused. Moreover, for example, an article tagged with "C Luo" and an article tagged with "Cristiano Ronaldo" cannot be recommended at the same time, although the two tags refer to the same people. Different tags result in a problem that two articles cannot be recommended at the same time, which leads to a low recommendation accuracy.

Therefore, the embodiments of the present disclosure provide a document recommendation method based on a semantic tag, in which the semantic tag is non-repetitive and unambiguous, thereby making the document recommendation more precise and improving the user experience, for example, changing the above tags into "Xiaomi-food" and "Xiaomi-mobile phone brand", and normalizing the tag "C Luo" into the tag "Cristiano Ronaldo".

FIG. 1 is a flow chart of a document recommendation method based on a semantic tag according to an embodiment of the present disclosure.

As illustrated in FIG. 1, the document recommendation method based on a semantic tag includes the following.

At block 101, a plurality of documents are matched by using a preset set of focus points so as to, for each document, obtain a first candidate tag set corresponding to the document.

Specifically, a semantic tag is calculated for each of the plurality of documents, each of the plurality of documents is tagged with the semantic tag, and a document recommendation is performed based on the semantic tag.

First, for each document, by using the preset set of focus points, a full match and a fuzzy match are performed on the document that needs to be tagged with a semantic tag so as to obtain the first candidate tag set corresponding to the document.

The preset set of focus points is obtained in advance. As a possible implementation, a plurality of queries are acquired, and the plurality of queries are filtered to acquire the queries each with an event, a topic or an entity property as the preset set of focus points.

Specifically, the queries in the search engine are rich in variety, and the queries each with an event, a topic or an entity property may be acquired as the set of focus points by filtering out pornographic and/or reactionary contents and question type queries. In other words, the queries each containing pornographic and/or reactionary contents, which are not conducive to spread positive energy, can be directly filtered out. Moreover, the question type queries such as why 1+1=2, can also be filtered out, since the question type query is not a focus point of an event, a topic or of an entity property.

For example, if the preset set of focus points contains "tofu", "cooking method of tofu", and "tomato", by performing the full match and fuzzy match on a file containing a sentence "by adding those two, tofu can be fresh, tasty and calcium-rich, having rich nutrients which are easy to be absorbed, such that tofu can be popular in children's meals.", the first candidate tag set containing "tofu" and "cooking method of tofu" can be obtained.

At block 102, an expanding processing is performed on each first candidate tag in the first candidate tag set corresponding to the document, to obtain a second candidate tag set corresponding to the document.

Specifically, for each document, by performing the expanding processing on each first candidate tag in the first candidate tag set corresponding to the document, for example, performing a mutual prediction on focus points appearing in the same article, and performing the expanding processing and generalization processing on each first candidate tag, tags each having a wider range and a strong correlation with the article but being not obvious in the article (for example, the tag "Story of Yanxi Palace" can be extended to acquire the tag "court drama") can be acquired, after the tags are fused, a second candidate tag set corresponding to the document is acquired.

At block 103, a normalization processing is performed on each second candidate tag in the second candidate tag set corresponding to the document by using a preset normalization dictionary to obtain a third candidate tag set corresponding to the document.

The normalization dictionary is generated in advance. As a possible implementation, a similarity between search results corresponding respectively to any two queries is obtained, and two queries corresponding to which the similarity is greater than the preset similarity threshold are used as candidate normalization queries, and the preset normalization dictionary is generated according to a plurality of candidate normalization queries.

Figure 2:
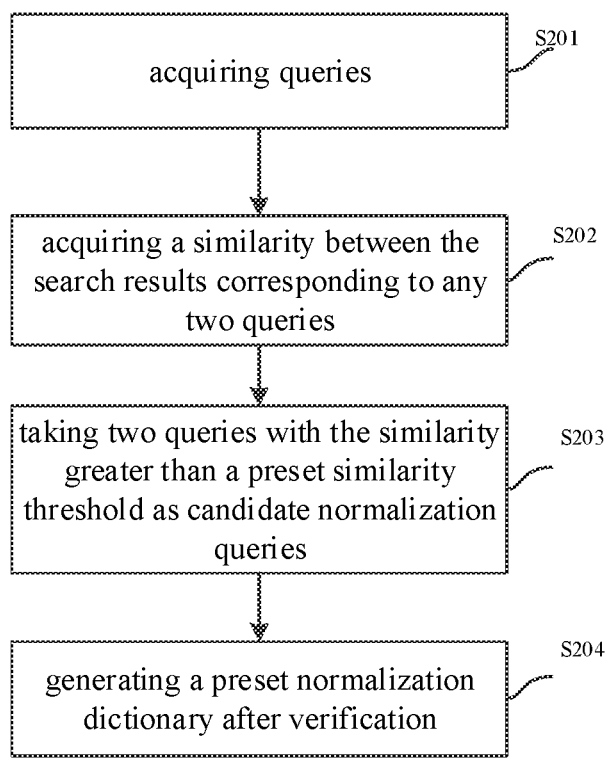
FIG. 2 is a schematic diagram illustrating a tag normalization processing according to an embodiment of the present disclosure.

Specifically, a query of a user used in the search engine and a result list selected by the user from the search results corresponding to the queries may be utilized to construct the preset normalization dictionary. For example, as shown in FIG. 2, for the two queries, i.e., query 1 and query 2, in the search query set at block S201, if a high similarity between respective article lists is obtained at block S202 (the similarity can be acquired by using a tf-idf (term frequency-inverse document frequency) technology, which is a commonly used weighting technique of information retrieval and data mining, on words in the result list to construct vectors or using word2vec (a set of related models used to generate word vectors) to calculate cosine distances), at block S203, the two queries can be determined as referring to the same object by comparing the similarity with the preset similarity threshold, and the normalization processing can be performed on the two queries. For example, a content similarity between articles obtained with the queries "EPL", "English Premier League" and "The Premier League" is relatively high, then those queries can be considered as candidate normalization items, and the preset normalization dictionary can be acquired after artificial verification at block S204.

At block 104, an expanding processing is performed on each third candidate tag in the third candidate tag set corresponding to the document by using a preset disambiguation dictionary to obtain a fourth candidate tag set corresponding to the document.

Specifically, for each document, the preset disambiguation dictionary is used to perform the expanding processing on each third candidate tag in the third candidate tag set corresponding to the document. This process is not for disambiguation, but aims to list all possible semantic tags to acquire the fourth candidate tag set corresponding to the document. For example, the third candidate tags contain tag "Li na", if the tag "Li na" corresponds to 10 semantic tags, such as "Li na_ Chinese women's tennis star" and "Li na_ Qingdao actress", all the 10 semantic tags are added to the fourth candidate tag set corresponding to the document.

As a possible implementation, a semantic item corresponding to each third candidate tag in the third candidate tag set corresponding to the document is queried in the candidate semantic item list, and a similarity between the document and the semantic item is calculated, a target semantic item is selected according to the similarity to expand the third candidate tag in the third candidate tag set corresponding to the document to obtain the fourth candidate tag set corresponding to the document.

Figure 3:
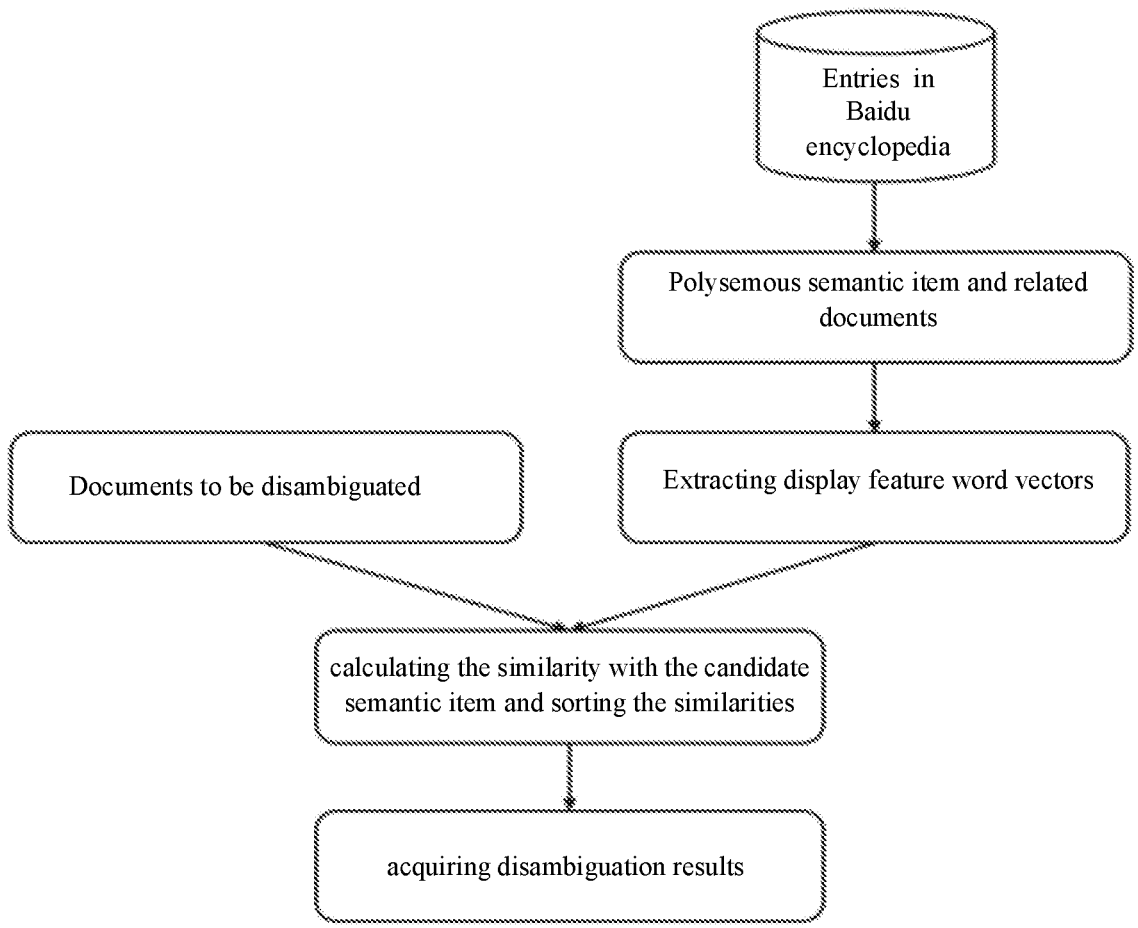
FIG. 3 is a schematic diagram illustrating a tag disambiguation processing according to an embodiment of the present disclosure.

As an example, polysemous words in Baidu encyclopedia can be used to mine the candidate semantic item list to be disambiguated. For example: Li Na's semantic items include "Li Na_ Chinese women's tennis star", "Li Na_ Qingdao actress" and the like, a description page of each of the disambiguated semantic items contains relevant Sback-ground, reference materials, tags and some text descriptions, these contents can be used to construct display feature word vectors for the corresponding semantic item. For example, the display feature word vectors for "Li Na_ Chinese women's tennis star" include 0.8 for tennis, 0.5 for competition, 0.3 for sports, and the display feature word vectors for "Li Na_ Qingdao actress" include 0.6 for host, 0.3 for art, 0.2 for actor. These feature word vectors can be used to calculate a similarity between the articles tagged "Li na" to obtain a real tag, as shown in FIG. 3.

At block 105, a semantic matching degree between each fourth candidate tag in the fourth candidate tag set corresponding to the document and the document can be acquired by using a semantic matching model, and the fourth candidate tag with the semantic matching degree greater than a preset matching threshold is taken as the semantic tag of the document to form a document library having semantic tags.

The semantic matching model is established in advance. As a possible implementation, a semantic tag corresponding to a training text is obtained, and the semantic matching model is established by training the training text and the semantic tag through a deep neural network.

Specifically, for each fourth candidate tag in the fourth candidate tag set corresponding to the document, the semantic matching degree of the fourth candidate tag and the document is calculated. The tags are sorted according to the score of the semantic matching degree, and the tag with the maximum score can be selected as the semantic tag of the document.

Figure 4:
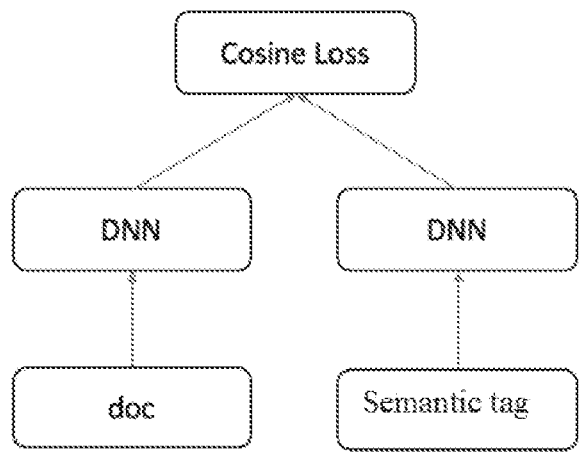
FIG. 4 is a schematic diagram of establishing a semantic matching model according to an embodiment of the present disclosure.

Specifically, in establishing the semantic matching model, a positive sample is the semantic tag corresponding to the training text, and a negative sample is a random negative sampling tag sample. The deep neural network (DNN) can be used to model the semantics of the training text and the semantic tag, which may be respectively represented as semantic vectors, and to optimize the cosine similarity in whole. The process of establishing the semantic matching model is shown in FIG. 4. The training text doc and the semantic tag are respectively input into the DNN for modeling, and optimizing the cosine similarity of cosine loss in whole.

Thus, each document is tagged with a corresponding semantic tag to form a document library having semantic tags.

At S106, historical behavior information of a user is acquired, and a historical semantic tag is acquired based on the historical behavior information, a target document obtained from the document library having semantic tags according to the historical semantic tag is recommended to the user.

Specifically, the historical behavior information may be operation behavior information such as a click operation, a search operation of the user. By analyzing the historical behavior information of the user, the corresponding historical semantic tag may be acquired, and the historical semantic tag is matched in the document library having semantic tags according to the historical semantic tag, to acquire corresponding target document to be recommended to the user.

With the document recommendation method based on a semantic tag according to the embodiments of the present disclosure, a plurality of documents are matched by using a preset set of focus points so as to, for each document, obtain a first candidate tag set corresponding to the document, an expanding processing is performed on each first candidate tag in the first candidate tag set corresponding to the document to obtain a second candidate tag set corresponding to the document, a normalization processing is performed on each second candidate tag in the second candidate tag set corresponding to the document by using a preset normalization dictionary to obtain a third candidate tag set corresponding to the document, an expanding processing is performed on each third candidate tag in the third candidate tag set corresponding to the document by using a preset disambiguation dictionary to obtain a fourth candidate tag set corresponding to the document, a semantic matching degree between each fourth candidate tag in the fourth candidate tag set corresponding to the document and the document is acquired by using a semantic matching model, and the fourth candidate tag with the semantic matching degree greater than a preset matching threshold is taken as the semantic tag of the document, to form a document library having semantic tags, historical behavior information of a user is acquired, and a historical semantic tag is acquired based on the historical behavior information, and a target document obtained from the document library having semantic tags based on the historical semantic tag is recommended to the user. Therefore, the semantic tags in the embodiments are non-repetitive and unambiguous, such that the document recommendation is more accurate and the user experience is improved.

In order to implement the above embodiments, the present disclosure also provides a document recommendation device based on a semantic tag.

Figure 5:
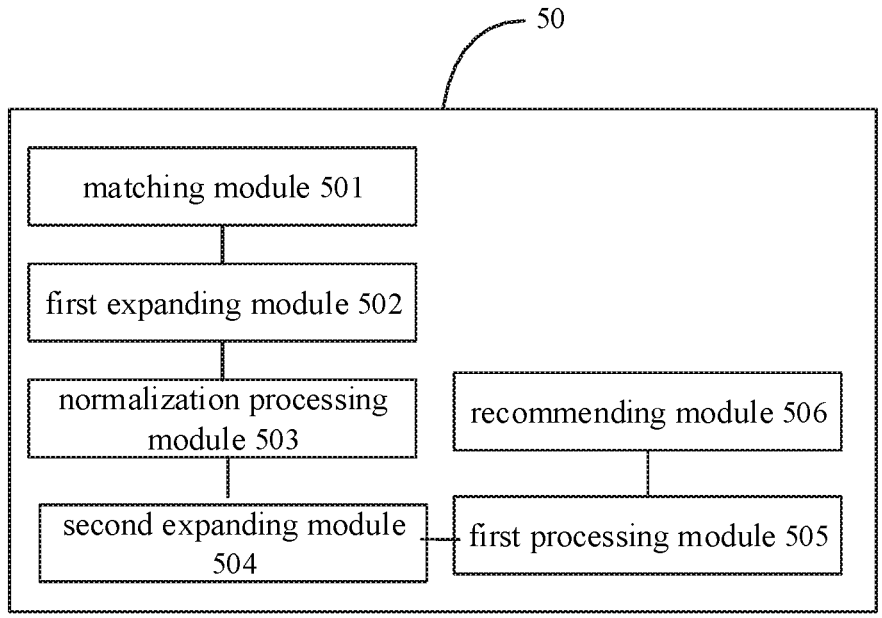
FIG. 5 is a block diagram of a document recommendation device based on a semantic tag according to an embodiment of the present disclosure.

FIG. 5 is a block diagram of a document recommendation device based on a semantic tag according to an embodiment of the present disclosure.

As illustrated in FIG. 5, the device 50 comprises: a matching module 501, a first expanding module 502, a normalization processing module 503, a second expanding module 504, a first processing module 505, and a recommending module 506.

The matching module 501 is configured to match a plurality of documents by using a preset set of focus points to, for each document, obtain a first candidate tag set corresponding to the document.

The first expanding module 502 is configured to perform an expanding processing on each first candidate tag in the first candidate tag set corresponding to the document, to obtain a second candidate tag set corresponding to the document.

The normalization processing module 503 is configured to perform a normalization processing on each second candidate tag in the second candidate tag set corresponding to the document by using a preset normalization dictionary to obtain a third candidate tag set corresponding to the document.

The second expanding module 504 is configured to perform an expanding processing on each third candidate tag in the third candidate tag set corresponding to the document by using a preset disambiguation dictionary to obtain a fourth candidate tag set corresponding to the document.

The first processing module 505 is configured to acquire a semantic matching degree between each fourth candidate tag in the fourth candidate tag set corresponding to the document and the document by using a semantic matching model, and take the fourth candidate tags with the semantic matching degree greater than a preset matching threshold as the semantic tag of the document, to form a document library having semantic tags.

The recommending module 506 is configured to acquire historical behavior information of a user, and acquire a historical semantic tag based on the historical behavior information of the user, and recommend a target document obtained from the document library having semantic tags based on the historical semantic tag to the user.

Figure 6:
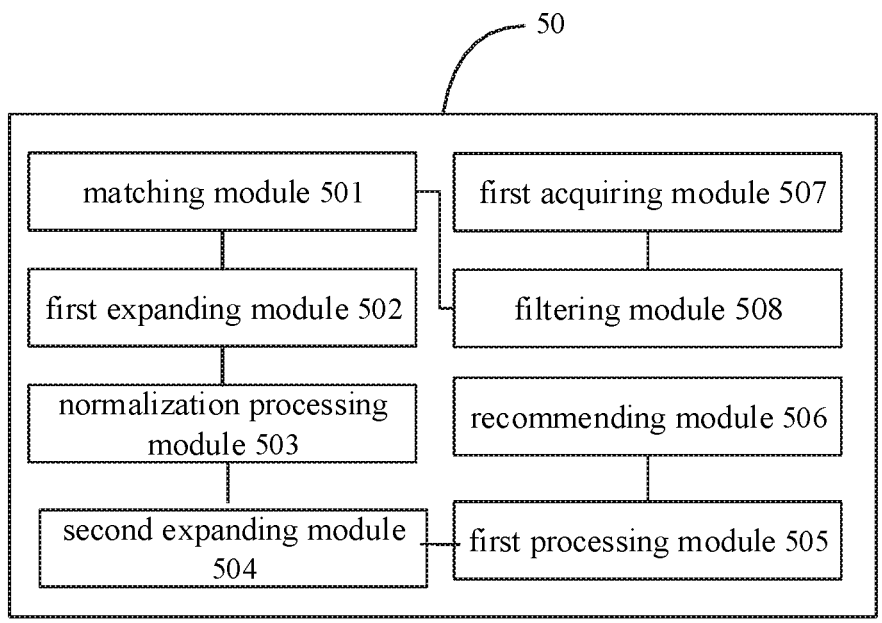
FIG. 6 is a block diagram of a document recommendation device based on a semantic tag according to another embodiment of the present disclosure.

In a possible implementation of the embodiments of the present disclosure, as shown in FIG. 6, on the basis of the embodiment shown in FIG. 5, the device 50 further comprises: a first acquiring module 507 and a filtering module 508.

The first acquiring module 507 is configured to acquire a plurality of queries.

The filtering module 508 is configured to acquire the queries each with an event, a topic or of an entity property as the preset set of focus points by filtering the plurality of queries.

Figure 7:
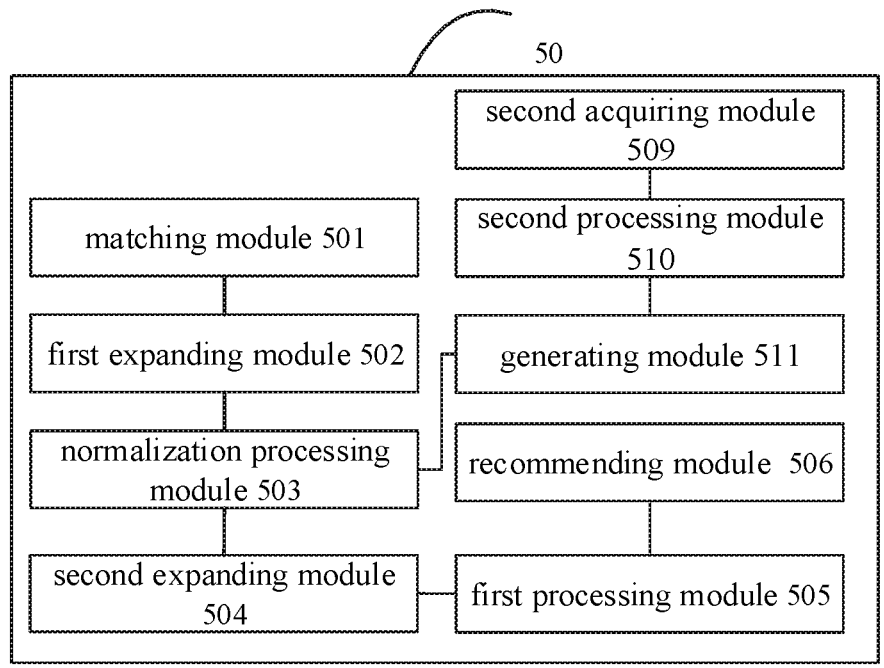
FIG. 7 is a block diagram of a document recommendation device based on a semantic tag according to a still embodiment of the present disclosure.

In a possible implementation of the embodiments of the present disclosure, as shown in FIG. 7, on the basis of the embodiment shown in FIG. 5, the device 50 further comprises: a second acquiring module 509, a second processing module 510, and a generating module 511.

The second acquiring module 509 is configured to acquire a similarity between search results corresponding respectively to any two queries.

The second processing module 510 is configured to take two queries with the similarity greater than a preset similarity threshold as candidate normalization queries.

The generating module 511 is configured to generate the preset normalization dictionary according to the plurality of candidate normalization queries.

In a possible implementation of the embodiments of the present disclosure, the second expanding module 504 is configured to query in a candidate semantic item list, a semantic item corresponding to the third candidate tag in the third candidate tag set corresponding to the document, calculate a similarity between the document and the semantic item, and select a target semantic item according to the similarity to expand the third candidate tag in the third candidate tag set corresponding to the document to obtain the fourth candidate tag set corresponding to the document.

Figure 8:
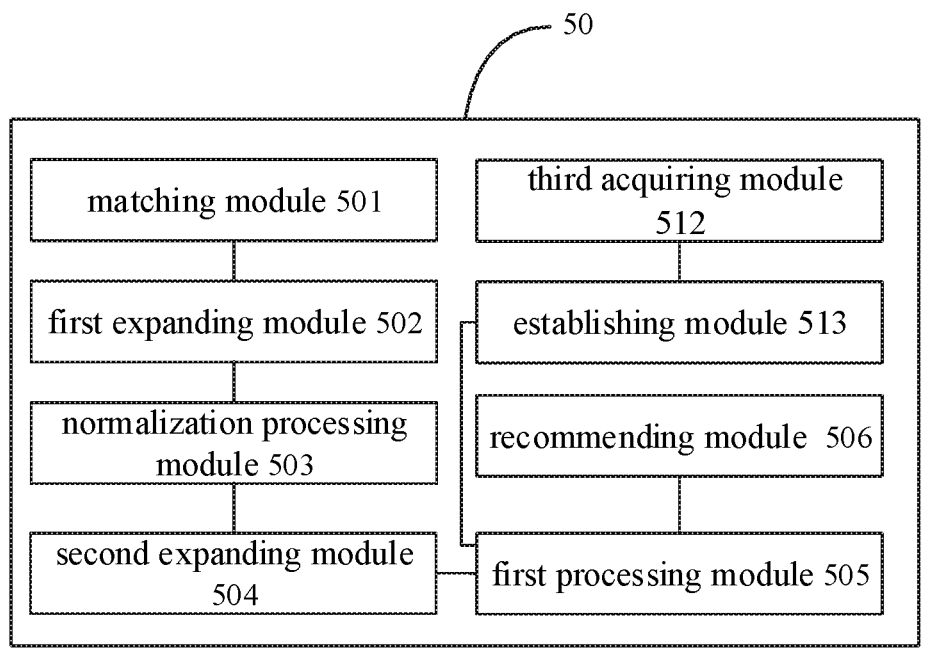
FIG. 8 is a block diagram of a document recommendation device based on a semantic tag according to a further embodiment of the present disclosure.

In a possible implementation of the embodiments of the present disclosure, as shown in FIG. 8, on the basis of the embodiment shown in FIG. 5, the device 50 further comprises: a third acquiring module 512 and an establishing module 513.

The third acquiring module 512 is configured to acquire a semantic tag corresponding to a training text.

The establishing module 513 is configured to establish the semantic matching model by training the training text and the semantic tag through a deep neural network.

It should be noted that the description of the document recommendation method based on a semantic tag in the above embodiments is also applicable to the document recommendation device based on a semantic tag in the embodiments, and the principle thereof is similar, which are not described herein again.

With the document recommendation device based on a semantic tag according to the embodiments of the present disclosure, a plurality of documents are matched by using a preset set of focus points so as to, for each document, obtain a first candidate tag set corresponding to the document, an expanding processing is performed on each first candidate tag in the first candidate tag set corresponding to the document to obtain a second candidate tag set corresponding to the document, a normalization processing is performed on each second candidate tag in the second candidate tag set corresponding to the document by using a preset normalization dictionary to obtain a third candidate tag set corresponding to the document, an expanding processing is performed on each third candidate tag in the third candidate tag set corresponding to the document by using a preset disambiguation dictionary to obtain a fourth candidate tag set corresponding to the document, a semantic matching degree between each fourth candidate tag in the fourth candidate tag set corresponding to the document and the document is acquired by using a semantic matching model, and the fourth candidate tag with the semantic matching degree greater than a preset matching threshold is taken as the semantic tag of the document, to form a document library having semantic tags, historical behavior information of a user is acquired, and a historical semantic tag is acquired based on the historical behavior information, and a target document obtained from the document library having semantic tags based on the historical semantic tag is recommended to the user. Therefore, the semantic tags in the embodiments are non-repetitive and unambiguous, such that the document recommendation is more accurate and the user experience is improved.

In order to implement the above embodiments, the present disclosure further provides a computer device including: a processor and a memory. The processor runs a program corresponding to an executable program code by reading the executable program code stored in the memory for implementing the document recommendation method based on a semantic tag as described in the foregoing embodiments.

Figure 9:
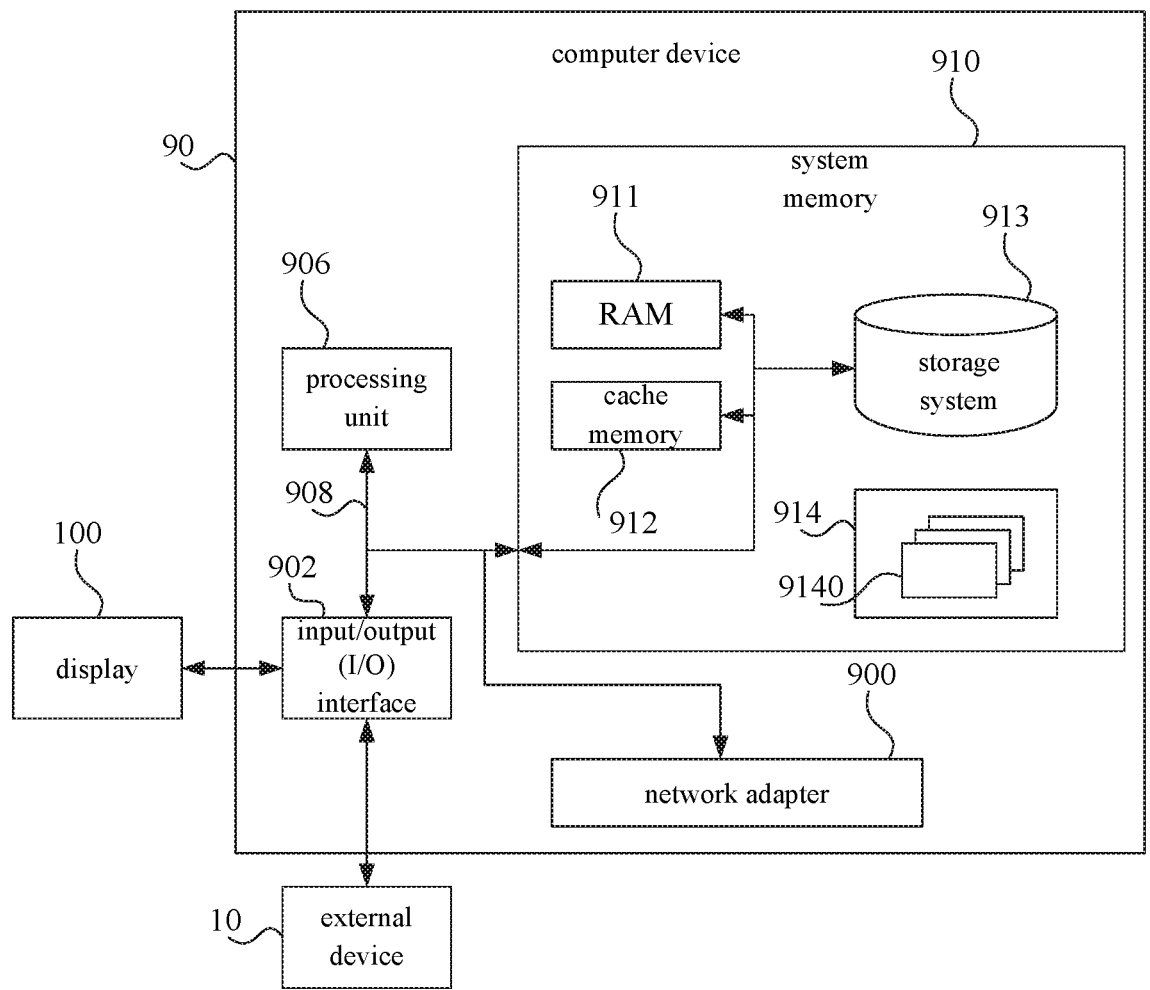
FIG. 9 is a block diagram of a computer device according to an embodiment of the present disclosure.

FIG. 9 is a block diagram of a computer device according to embodiments of the present disclosure, which illustrates the structure of an exemplary computer device 90 suitable for implementing an embodiment of the present application. The computer device 90 shown in FIG. 9 is merely an example and should not impose any limitation on the function and scope of use of the embodiments of the present disclosure.

As illustrated in FIG. 9, the computer device 90 may be represented via a general computer device form. Components of the computer device 90 may include but be not limited to one or more processors or processing units 906, a system memory 910, a bus 908 connecting various system components including the system memory 910 and the processing units 906.

The bus 908 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 90 typically includes a variety of computer system readable media. These media may be any available media accessible by the computer device 90 and includes both volatile and non-volatile media, removable and non-removable media.

The system memory 910 may include a computer system readable medium in the form of volatile memory, such as a random access memory (hereinafter referred to as RAM) 911 and/or a high speed cache memory 912. The computer device 90 may further include other removable or non-removable, volatile or non-volatile computer system storage media. By way of example only, the storage system 913 may be configured to read and write a non-removable and non-volatile magnetic media (not shown in FIG. 9, commonly referred to as a "hard drive"). Although not shown in FIG. 9, a magnetic disk driver for reading from and writing to a removable and non-volatile magnetic disk (such as "floppy disk" and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 908 via one or more data medium interfaces. The system memory 910 may include at least one program product. The program product has a set (such as, at least one) of program modules configured to perform the functions of various embodiments of the present disclosure.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C ++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server.

A program/utility 914 having a set (at least one) of the program modules 9140 may be stored in, for example, the memory 910. The program modules 9140 include but are not limited to, an operating system, one or more application programs, other programs modules, and program data. Each of these examples, or some combination thereof, may include an implementation of a network environment. The program modules 9140 generally perform the functions and/or methods in the embodiments described herein.

The computer device 90 may also communicate with one or more external devices 10 (such as, a keyboard, a pointing device, a display 100, etc.). Furthermore, the computer device 90 may also communicate with one or more communication devices enabling a user to interact with the computer device 90 and/or other devices (such as a network card, modem, etc.) enabling the computer device 12 to communicate with one or more computer devices. This communication can be performed via the input/output (I/O) interface 902. Also, the computer device 90 may communicate with one or more networks (such as a local area network (hereafter referred to as LAN), a wide area network (hereafter referred to as WAN) and/or a public network such as an Internet) through a network adapter 900. As shown in FIG. 9, the network adapter 900 communicates with other modules of the computer device 90 over the bus 908. It should be understood that, although not shown in FIG. 9, other hardware and/or software modules may be used in connection with the computer device 90. The hardware and/or software includes, but is not limited to, microcode, device drivers, redundant processing units, external disk drive arrays, RAID systems, tap Drive and data backup storage system.

The processing unit 906 is configured to execute various functional applications and data processing by running programs stored in the system memory 910, for example, implementing the speech noise reduction method based on the semantic tag based method of recommending documents provided in embodiments of the present disclosure.

In order to achieve the above objective, the present disclosure provides a non-transitory computer readable storage medium having a computer program stored thereon. When the program is executed by a processor, the document recommendation method based on a semantic tag as described in the embodiments is implemented.

In order to achieve the above objective, the present disclosure provide a computer program product, when the instructions in the computer program product are executed by a processor, the document recommendation method based on a semantic tag as described in the embodiments is implemented.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

It should be illustrated that, in descriptions of the present disclosure, terms such as "first" and "second" are used herein for purposes of description and are not construed as indicating or implying relative importance or significance. Furthermore, in the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprise other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A document recommendation method based on a semantic tag, comprising:
    matching a plurality of documents by using a preset set of focus points so as to, for each document, obtain a first candidate tag set corresponding to the document;
    performing an expanding processing on each first candidate tag in the first candidate tag set corresponding to the document, to obtain a second candidate tag set corresponding to the document;
    performing a normalization processing on each second candidate tag in the second candidate tag set corresponding to the document by using a preset normalization dictionary to obtain a third candidate tag set corresponding to the document;
    performing an expanding processing on each third candidate tag in the third candidate tag set corresponding to the document by using a preset disambiguation dictionary to obtain a fourth candidate tag set corresponding to the document;
    acquiring a semantic matching degree between each fourth candidate tag in the fourth candidate tag set corresponding to the document and the document by using a semantic matching model, and taking the fourth candidate tag with the semantic matching degree greater than a preset matching threshold as the semantic tag of the document, to form a document library having semantic tags; and
    acquiring historical behavior information of a user, and acquiring a historical semantic tag based on the historical behavior information, and recommending a target document obtained from the document library having semantic tags based on the historical semantic tag to the user.

2. The method according to claim 1, further comprising:
    acquiring a plurality of queries; and
    acquiring queries each with an event, a topic or an entity property as the preset set of focus points by filtering the plurality of queries.

3. The method according to claim 1, further comprising:
    acquiring a similarity between search results corresponding respectively to any two queries;
    taking two queries with the similarity greater than a preset similarity threshold as candidate normalization queries; and
    generating the preset normalization dictionary based on the candidate normalization queries.

4. The method according to claim 1, wherein performing the expanding processing on each third candidate tag in the third candidate tag set corresponding to the document by using the preset disambiguation dictionary to obtain the fourth candidate tag set corresponding to the document comprises:
    querying, in a candidate semantic item list, a semantic item corresponding to the third candidate tag in the third candidate tag set corresponding to the document;
    calculating a similarity between the document and the semantic item;
    selecting a target semantic item based on the similarity to expand the third candidate tag in the third candidate tag set corresponding to the document to obtain the fourth candidate tag set corresponding to the document.

5. The method according to claim 1, further comprising:
    acquiring a semantic tag corresponding to a training text; and
    establishing the semantic matching model by training the training text and the semantic tag through a deep neural network.

6. A document recommendation device based on a semantic tag, comprising a processor and a memory, wherein the processor runs a program corresponding to an executable program code by reading the executable program code stored in the memory for implementing a document recommendation method based on a semantic tag, said method comprises:
    matching a plurality of documents by using a preset set of focus points so as to, for each document, obtain a first candidate tag set corresponding to the document;
    performing an expanding processing on each first candidate tag in the first candidate tag set corresponding to the document, to obtain a second candidate tag set corresponding to the document;

performing a normalization processing on each second candidate tag in the second candidate tag set corresponding to the document by using a preset normalization dictionary to obtain a third candidate tag set corresponding to the document;

performing an expanding processing on each third candidate tag in the third candidate tag set corresponding to the document by using a preset disambiguation dictionary to obtain a fourth candidate tag set corresponding to the document;

acquiring a semantic matching degree between each fourth candidate tag in the fourth candidate tag set corresponding to the document and the document by using a semantic matching model, and taking the fourth candidate tag with the semantic matching degree greater than a preset matching threshold as the semantic tag of the document, to form a document library having semantic tags; and acquiring historical behavior information of a user, and acquiring a historical semantic tag based on the historical behavior information, and recommending a target document obtained from the document library having semantic tags based on the historical semantic tag to the user.

7. The device according to claim 6, wherein the method further comprises:

acquiring a plurality of queries; and acquiring queries each with an event, a topic or an entity property as the preset set of focus points by filtering the plurality of queries.

8. The device according to claim 6, wherein the method further comprises:

acquiring a similarity between search results corresponding respectively to any two queries;

taking two queries with the similarity greater than a preset similarity threshold as candidate normalization queries; and generating the preset normalization dictionary based on the candidate normalization queries.

9. The device according to claim 6, wherein performing the expanding processing on each third candidate tag in the third candidate tag set corresponding to the document by using the preset disambiguation dictionary to obtain the fourth candidate tag set corresponding to the document comprises:

querying, in a candidate semantic item list, a semantic item corresponding to the third candidate tag in the third candidate tag set corresponding to the document;

calculating a similarity between the document and the semantic item;

selecting a target semantic item based on the similarity to expand the third candidate tag in the third candidate tag set corresponding to the document to obtain the fourth candidate tag set corresponding to the document.

10. The device according to claim 6, wherein the method further comprises:

acquiring a semantic tag corresponding to a training text; and establishing the semantic matching model by training the training text and the semantic tag through a deep neural network.

11. A non-transitory computer readable storage medium having a computer program stored thereon, wherein when the program is executed by a processor, implementing a document recommendation method based on a semantic tag, said method comprises:

matching a plurality of documents by using a preset set of focus points so as to, for each document, obtain a first candidate tag set corresponding to the document; performing an expanding processing on each first candidate tag in the first candidate tag set corresponding to the document, to obtain a second candidate tag set corresponding to the document;

performing a normalization processing on each second candidate tag in the second candidate tag set corresponding to the document by using a preset normalization dictionary to obtain a third candidate tag set corresponding to the document;

performing an expanding processing on each third candidate tag in the third candidate tag set corresponding to the document by using a preset disambiguation dictionary to obtain a fourth candidate tag set corresponding to the document;

acquiring a semantic matching degree between each fourth candidate tag in the fourth candidate tag set corresponding to the document and the document by using a semantic matching model, and taking the fourth candidate tag with the semantic matching degree greater than a preset matching threshold as the semantic tag of the document, to form a document library having semantic tags; and acquiring historical behavior information of a user, and acquiring a historical semantic tag based on the historical behavior information, and recommending a target document obtained from the document library having semantic tags based on the historical semantic tag to the user.

12. The non-transitory computer readable storage medium according to claim 11, wherein the method further comprises:

acquiring a plurality of queries; and acquiring queries each with an event, a topic or an entity property as the preset set of focus points by filtering the plurality of queries.

13. The non-transitory computer readable storage medium according to claim 11, wherein the method further comprises:

acquiring a similarity between search results corresponding respectively to any two queries;

taking two queries with the similarity greater than a preset similarity threshold as candidate normalization queries; and generating the preset normalization dictionary based on the candidate normalization queries.

14. The non-transitory computer readable storage medium according to claim 11, wherein performing the expanding processing on each third candidate tag in the third candidate tag set corresponding to the document by using the preset disambiguation dictionary to obtain the fourth candidate tag set corresponding to the document comprises:

querying, in a candidate semantic item list, a semantic item corresponding to the third candidate tag in the third candidate tag set corresponding to the document;

calculating a similarity between the document and the semantic item;

selecting a target semantic item based on the similarity to expand the third candidate tag in the third candidate tag set corresponding to the document to obtain the fourth candidate tag set corresponding to the document.

15. The non-transitory computer readable storage medium according to claim 11, wherein the method further comprises:

acquiring a semantic tag corresponding to a training text; and establishing the semantic matching model by training the training text and the semantic tag through a deep neural network.

* * * * *